(12) United States Patent
Miro Panades et al.

(10) Patent No.: US 7,725,515 B2
(45) Date of Patent: May 25, 2010

(54) DIGITAL FILTER FOR REDUCTING BLOCKING ARTIFACTS IN IMAGES

(75) Inventors: Ivan Miro Panades, Paris (FR); Carolina Miro Sorolla, Saint Nom la Breteche (FR)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 997 days.

(21) Appl. No.: 10/522,084

(22) PCT Filed: Jul. 8, 2003

(86) PCT No.: PCT/IB03/03065

§ 371 (c)(1),
(2), (4) Date: Jan. 21, 2005

(87) PCT Pub. No.: WO2004/010705

PCT Pub. Date: Jan. 29, 2004

(65) Prior Publication Data

US 2005/0248363 A1 Nov. 10, 2005

(30) Foreign Application Priority Data

Jul. 24, 2002 (FR) .................................. 02 09391

(51) Int. Cl.
*G06F 17/10* (2006.01)
(52) U.S. Cl. .................................... 708/321
(58) Field of Classification Search ................... 708/321
See application file for complete search history.

(56) References Cited

U.S. PATENT DOCUMENTS 3,883,726 A * 5/1975 Schmidt ...................... 708/404
4,237,551 A * 12/1980 Narasimha .................. 370/307
5,819,035 A 10/1998 Devaney et al.
6,134,571 A * 10/2000 Kresch et al. ............... 708/321

FOREIGN PATENT DOCUMENTS

| CN | 1151662 A | 6/1997 |
|---|---|---|
| CN | 1264482 A | 8/2000 |
| WO | 99/04497 A2 | 1/1999 |

OTHER PUBLICATIONS

Wang Z "Fast Algorithm for the Discrete W Transform and for the Discrete Fourier Transform" IEEE Trans. On Acoustics, Speech & Signal Processing, vol. ASSP-32, No. 4 (1984), pp. 803-816.
Lee, "A New Algorithm to Compute the Discrete Cosine Transform" IEEE Trans. on Acoustics, Speech & Signal Processing, vol. ASSP-32, No. 6 (1984), pp. 1243-1245.
Paek, et al. "A Projection-Based Post-Processing Technique To Reduce Blocking Artifact Using a Priori Information..." IEEE Proc. Int'l Conf. on Image Processing, vol. 1 (1996), pp. 53-56.
Paek, et al. "On the POCS-Based Postprocessing Technique to Reduce the Blocking Artifacts in Transform Coded Images", IEEE Trans. on Circuits & Systems for Video Techn., vol. 8, No. 3 (Jun. 1998), pp. 358-367.

* cited by examiner

*Primary Examiner*—David H Malzahn
(74) *Attorney, Agent, or Firm*—DLA Piper LLP (US)

(57) ABSTRACT

The present invention relates to a digital data filtering circuit. This digital data filtering circuit is able to implement the calculation steps of a discrete transform of a set of 8 original data (w), and calculating an inverse discrete transform of the set of transformed data thus obtained. For this purpose, it comprises a first filtering module (FILo1) intended to filter the odd transformed data or the 3 odd transformed data items having the highest frequencies in the set of transformed data, and a second filtering module (FILo2) connected to the first filtering module and intended to filter the 2 odd transformed data having the highest frequencies in the set of transformed data.

12 Claims, 7 Drawing Sheets

DIGITAL FILTER FOR REDUCING BLOCKING ARTIFACTS IN IMAGES

The present invention relates to a digital data filtering device able to implement the steps of calculating a discrete transform of a set of 8 original data, and calculating an inverse discrete transform of the set of transformed data thus obtained, said circuit being able to filter at least one data item among the set of transformed data.

It finds in particular its application in video decoders, in portable apparatus including such decoders and in television receivers. In these devices, the correction of digital images previously coded and then decoded according to a block-based coding technique, the MPEG ("Moving Pictures Expert Group") standard for example, is necessary for attenuating the visual artifacts caused by said block-based coding technique.

The video compression algorithms using block-based coding techniques sometimes result in a degradation of the quality of the coded and then decoded images. One of the visual artifacts most often observed with these coding techniques is called the blocking artifact.

The article entitle "A projection-based post-processing technique to reduce blocking artifacts using a priori information on DCT coefficients of adjacent blocks", published by Hoon Paek and Sang-Uk Lee, in "Proceedings of 3$^{rd}$ IEEE International Conference on Image Processing, Vol. 2, Lausanne, Switzerland, 16-19 Sep. 1996, p. 53-56" describes a method of filtering data contained in a digital image. The purpose of this data filtering method is to correct, in the frequency domain, the coefficients which correspond to these blocking artifacts.

Figure 1:
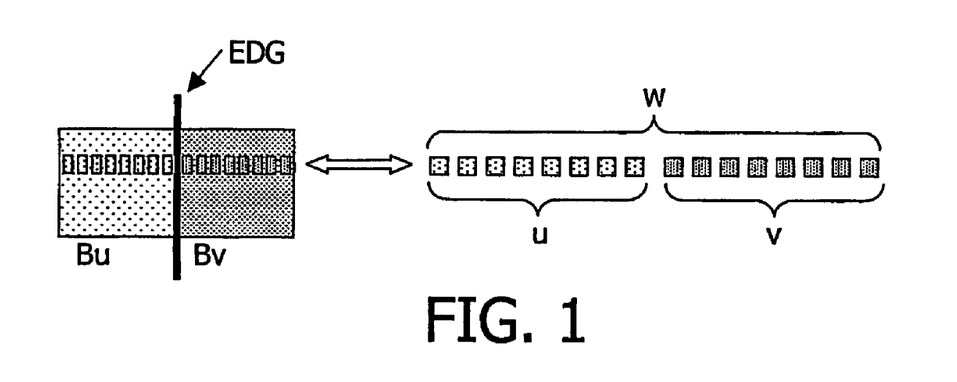
FIG. 1 illustrates two adjacent segments disposed on each side of a block edge.

It is based on the following principle. Let there be two adjacent segments u and v, as illustrated in FIG. 1, belonging respectively to two blocks Bu and Bv of pixels and disposed on each side of a block edge EDG. If a blocking artifact is present between the segments u and v, the segment w corresponding to the concatenation of the first and second segments includes spatial high frequencies which go beyond those of the segments u and v.

Figure 2:
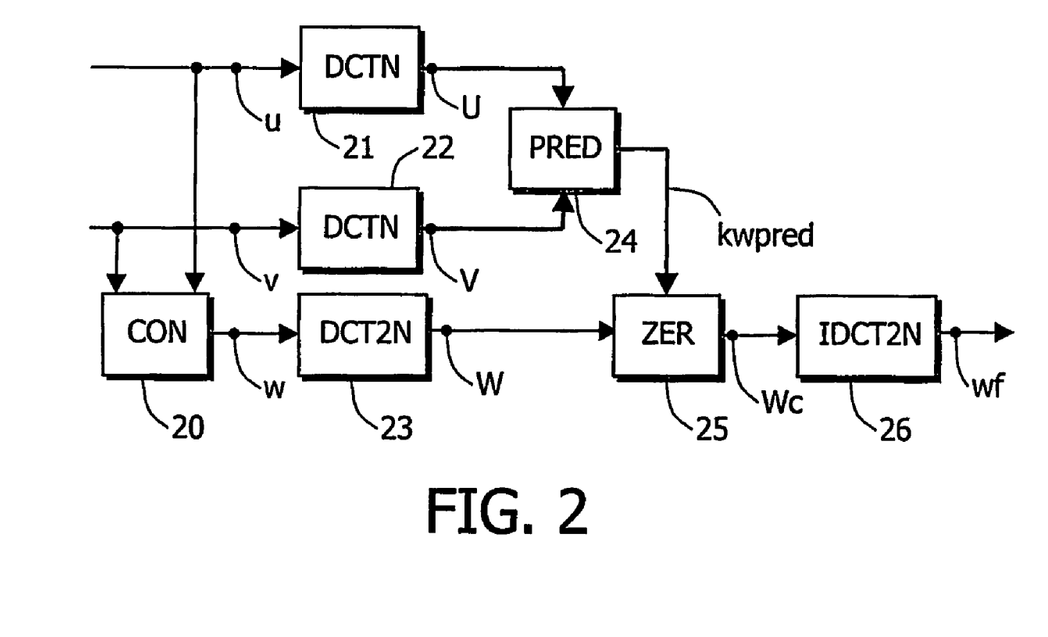
FIG. 2 shows the data processing method of the state of the art.

In order to find and eliminate the frequencies associated with the blocking artifacts, the data filtering method of the state of the art, illustrated in FIG. 2, comprises the following steps of:

calculating a discrete cosine transformation DCTN (21) of the segment u of N pixels with N=8 in the following example:

$$U = DCTN[u] = \{U(0), U(1), \ldots, U(N-1)\}, \text{ with}$$

$$U(k) = \alpha(k) \sum_{n=0}^{N-1} u(n)\cos\left(\frac{\pi(2n+1)k}{2N}\right)$$

where k is the frequency of the transformed data U, k ∈ [0,N=1];

calculating a discrete cosine transformation DCTN (22) of the segment v adjacent to the segment u: V=DCTN(v)= {V(0), V(1), . . . , V(N−1)}, that is to say $$V(k) = \alpha(k) \sum_{n=0}^{N-1} v(n)\cos\left(\frac{\pi(2n+1)k}{2N}\right);$$

calculating a discrete cosine transformation DCT2N (23) of the segment w of 2N, that is to say 16 pixels, corresponding to the concatenation CON (20) of the segments u and v: W=DCT(w)={W(0), W(1), . . . , W(2N−1)}, that is to say $$W(k) = \frac{1}{\sqrt{2}} \alpha(k) \sum_{n=0}^{2N-1} v(n)\cos\left(\frac{\pi(2n+1)k}{4N}\right);$$

calculating PRED (24) a predicted maximum frequency kwpred according to the maximum frequencies kumax and kvmax of U and V, as follows:
kwpred=2.max(kumax, kvmax)+2
with kumax=max (k∈{0, . . . ,N−1}/U(k)≠0),
kvmax=max (k∈{0, . . . ,N−1}/V(k)≠0), and
max is the function which gives the maximum of k from among a set of given values;

correcting by zeroing ZER (25) the odd transformed data W resulting from the global discrete transform whose frequency is higher than the predicted maximum frequency, supplying corrected transformed data Wc;

calculating an inverse discrete cosine transformation IDCT2N (26) of the corrected transformed data, supplying filtered data wf which are then intended to be displayed on a screen.

The aim of the present invention is to propose a data filtering circuit for implementing simply the data filtering method of the state of the art.

Figure 3:
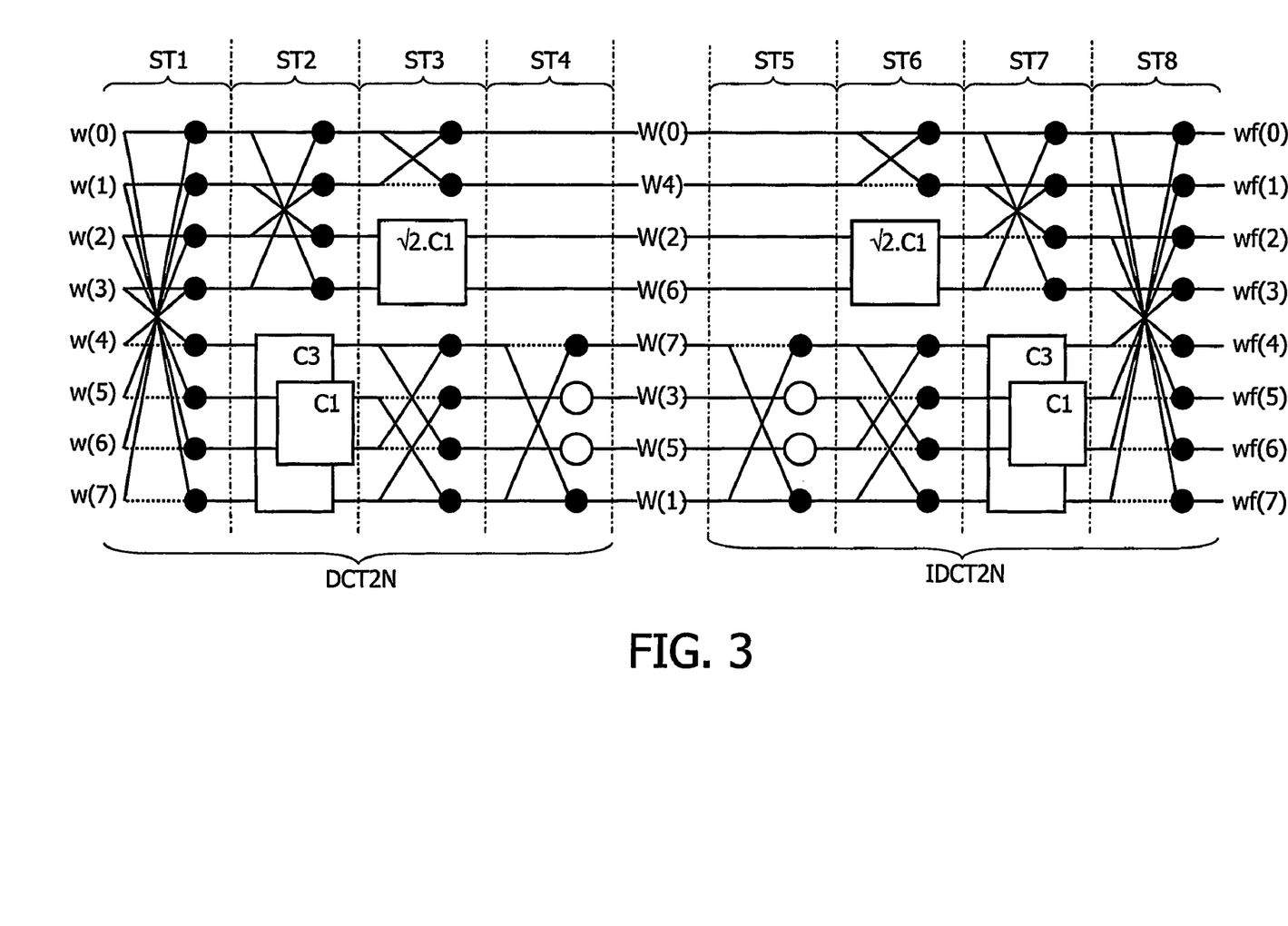
FIG. 3 illustrates a circuit implementing in a conventional manner the data processing method of the state of the art.

This is because the implementation of such a method may prove to be complex in terms of number of operations, in particular with regard to the sequence comprising the discrete cosine transformation DCT2N, followed by the correction of the odd transformed data and the inverse discrete cosine transformation IDCT2N. FIG. 3 illustrates what would be a conventional implementation of such a sequence in the case where 2N=8. The direct DCT2N and inverse IDCT2N discrete cosine transformations process the 2N concatenated data w(0) to w(7) using the Lee algorithm. The black circles represent additions, a horizontal dotted line preceding a black circle corresponding to a data item to be subtracted. The white circles correspond to multiplications. The multiplications and divisions by a power of 2 have not been depicted in the diagram in FIG. 3 and the following figures since they have little influence on the complexity of the implementation.

The implementation of the global discrete cosine transformation DCT2N comprises four successive stages separated in FIG. 3 by vertical dotted lines, namely:

a first stage ST1 comprising 8 adders performing additions or subtractions using the concatenated data w(0) to w(7), a second stage ST2 comprising 4 adders and 2 data rotation units C1 and C3, a rotation unit comprising 2 adders and 4 multipliers according to a principle known to a person skilled in the art, a third stage ST3 comprising 6 adders and one rotation unit √2C1, and a fourth stage ST4 comprising 2 adders and 2 multipliers, and supplying the odd transformed data W(1), W(3), W(5) and W(7), the even transformed data W(0), W(2), W(4) and W(6) resulting from the data processed by the third stage and not processed in the fourth stage.

The implementation of the correction by zeroing of the odd transformed data resulting from the discrete transform DCT2N whose frequency is greater than the predicted maximum frequency, not shown in FIG. 3, is effected by means of logic circuits implementing the function "AND" between a transformed data item W(i) and an output of a control circuit able to deliver a "1" level or a "0" level according to the value of the predicted maximum frequency.

The implementation of the inverse discrete cosine transformation IDCT2N comprises 4 successive stages:
- a fifth stage ST5 comprising 2 adders and 2 multipliers able to process the corrected odd transformed data,
- a sixth stage ST6 comprising 6 adders and one rotation unit √2C1,
- a seventh stage ST7 comprising 4 adders and 2 rotation units C1 and C3, and
- an eighth and last stage ST8 comprising 8 adders, and supplying the filtered data wf(0) to wf(7).

The circuit for filtering data resulting from this conventional implementation would therefore lead to a complex solution comprising two transformations DCTN, a transformation DCT2N and a transformation IDCT2N, requiring a total of 36 multiplications and 68 additions.

In order to remedy this drawback, the filtering circuit according to the invention is characterized in that it comprises:
- a first filtering module intended to filter the 3 odd transformed data having the highest frequencies in the set of transformed data,
- a second filtering module connected to the first filtering module and intended to filter the 2 odd transformed data having the highest frequencies in the set of transformed data.

With a data filtering circuit having a modular structure of this type, the number of multipliers and adders is reduced since it has been possible to optimize each module by taking account of its destination, as will be seen in more detail later in the description. The implementation of the data processing sequence comprising the two transformations DCTN and then in series the transformation DCT2N, the correction of the transformed data and the inverse transformation IDCT2N are thus simplified. In addition, the modular structure of the filtering circuit makes it possible to deactivate the modules which are not operational in the circuit at a given moment and to have an optimized structure in the part which is activated, resulting in a filtering circuit which is both less expensive and has lower power consumption.

The invention will be further described with reference to examples of embodiments shown in the drawings to which, however, the invention is not restricted.

The present invention relates to a digital data filtering circuit making it possible to correct blocking artifacts in the frequency domain.

In the following description, the discrete transform is a discrete cosine transformation DCT or IDCT. It will be clear however to a person skilled in the art that the present invention applies to any linear discrete transform.

In the example described below for data coded and then decoded according to the MPEG standard, the sets of data u and v each contain the luminance values associated with N=4 consecutive pixels.

Figure 4A:
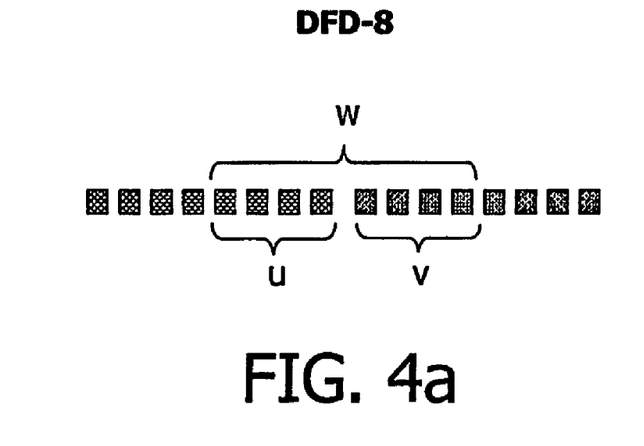
FIG. 4a and FIG. 4b depict two sets of pixels which can be processed by the filtering circuit according to the invention.

In the case of the MPEG standard, the processing sequence comprising the DCTN, DCT2N and IDCT2N transformations is applied to a set of 16 data, the method used being referred to as DFD-16 and providing an excellent image quality at the output. In order to save on calculation resources, it is more advantageous to apply the processing sequence to a set of 8 data according to the principle in FIG. 4a, with segments u and v of 4 consecutive pixels distributed immediately on each side of a block edge. This solution, known as DFD-8, has the merit of reducing the complexity of the filtering method to the detriment however of its efficiency and therefore the quality of the image obtained at the output of the filtering.

Figure 4B:
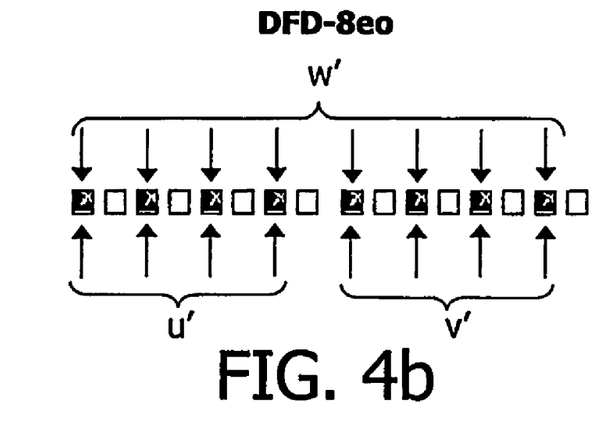

This is why, in the preferred embodiment, the sets of data u and v are respectively subdivided into two subsets u', u" on the one hand and v', v" on the other hand, the subsets u', v' containing the data of odd rank and the subsets u" and v" containing the data of even rank. The sets u', v' and w' are depicted in FIG. 4b.

The calculation steps of the DCTN and DCT2N transformations are applied to the subsets u', v' on the one hand and u", v" on the other hand supplying respectively the transformed data U', V', W' on the one hand and U", V", W" on the other hand.

The determination step PRED supplies in parallel the predicted maximum frequencies kw'pred and kw"pred calculated as follows:

kw'pred=2.max(ku'max, kv'max)+2
with ku'max=max(k∈{0, . . . ,N−1}/abs(U'(k))>Th or Tv)
kv'max=max(k∈{0, . . . ,N−1}/abs(V'(k))>Th or Tv)
kw"pred=2.max(ku"max, kv"max)+2
with ku"max=max(k∈{0, . . . ,N−1}/abs(U"(k))>Th or Tv)
kv"max=max(k∈{0, . . . ,N−1}/abs(V"(k))>Th or Tv)

where, for example, Th=10 and Tv=5 in the case of a frame comprising two interlaced fields in the standard format (one field comprises 228 lines of 720 pixels).

The correction step ZER is then applied independently to the transformed data W' and W" with:
- a substep of detecting natural contours such that, for example:
  $|\overline{u}'-\overline{v}'|>25$, $ku'$max<1 and $kv'$max<1
  or $|\overline{u}"-\overline{v}"|>25$, $ku"$max<1 and $kv"$max<1
- a substep of zeroing the transformed data W' or W" resulting from the global discrete transform whose frequency is higher than the predicted maximum frequency kw'pred or kw"pred.

This embodiment, called DFD-8eo, makes it possible to have a complexity equal to the DFD-8 method in terms of number of gates but with double frequency, whilst preserving a good image quality at the output of the filtering.

Finally, in the case of data coded and then decoded according to the H.264 standard, the filtering method is applied directly to data segments u and v which each contain the luminance values associated with N=4 consecutive pixels, the coding blocks according to this standard being 4×4 pixels.

When implementing the data filtering method described above in the present invention, certain simplifications are made.

A first simplification can be made with regard to the implementation of the rotations. If X0 and X1 are the inputs of a rotation and Y0 and Y1 the outputs, these variables are linked by the following equations:

$$Y0 = a*X0 + b*X1$$

$$Y1 = -b*X0 + a*X1$$

Figure 5A:
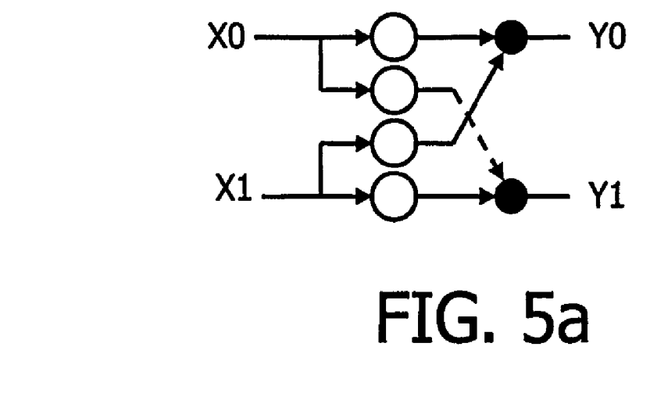
FIG. 5a illustrates a conventional implementation of a rotation whilst

FIG. 5a illustrates a conventional implementation of the rotation which then comprises 4 multiplications and 2 additions. The preceding equations can be rewritten in the following form:

$$Y0 = (b-a)*X1 + a*(X0+X1) = A*X1 + a*(X0+X1)$$

$$Y1 = -(a+b)*X0 + a*(X0+X1) = B*X0 + a*(X0+X1)$$

Figure 5B:
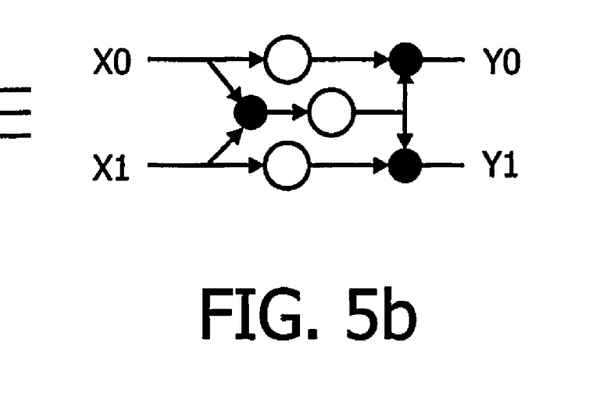
FIG. 5b illustrates a simplified implementation of said rotation according to the invention.

FIG. 5b illustrates the new implementation of the rotation, which then comprises no more than 3 multiplications and 3 additions, one multiplication having been replaced by an addition, which reduces the complexity of the processing circuit, an adder having a simpler structure than a multiplier.

A second simplification consists of calculating the odd transformed data W(k) resulting from the DCT2N transformation directly from the transformed data U(k/2) and V(k/2) resulting from the DCTN transformation according to the following equation:

$$W(k) = \frac{1}{\sqrt{2}}\left(U\left(\frac{k}{2}\right) + (-1)^{\frac{k}{2}} V\left(\frac{k}{2}\right)\right) \text{ with } k = 0, 2, 4, 6.$$

Figure 6:
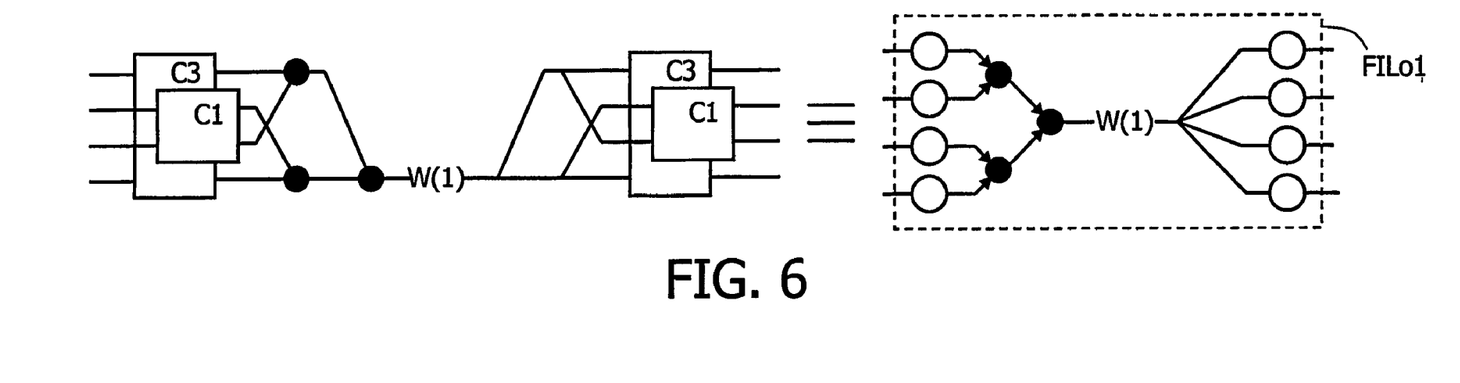
FIG. 6 is a diagram depicting a first filter intended to filter odd transformed data, FIG. 7 a diagram depicting a second filter intended to filter odd transformed data.

FIG. 6 depicts a first filter FILo1 intended to filter the odd transformed data W(3), W(5) and W(7). A conventional implementation as depicted on the left of FIG. 6 consists of eliminating the wires corresponding to the zeroed transformed data. As a conventional rotation comprises 2 additions and 4 multiplications, the conventional implementation consists of 11 additions and 16 multiplications.

However, if Q and S are the inputs of a rotation C1 or C3 situated on the same side as the DCT2N transformation and followed by an adder, this gives:

$$(a*Q+b*S)+(-b*Q+a*S) = Q(a-b)+S(a+b),$$

a and b being multiplying coefficients easily determined by a person skilled in the art according to the type of discrete transform used. The invention therefore proposes, in this case, to replace a rotation with two multipliers whose respective multiplying coefficients are (a−b) and (a+b).

In addition, the inputs of a rotation C1 or C3 situated on the same side as the inverse transformation IDCT2N are identical and equal to W(1). The outputs of a rotation are then:

$$W(1)(c-d) \text{ and } W(1)(c+d)$$

c and d being multiplying coefficients easily determined by a person skilled in the art according to the type of discrete transform used. The invention therefore proposes in this case to replace a rotation with two multipliers with the respective multiplying coefficients (c−d) and (c+d). Consequently, each rotation having been replaced by two multipliers as depicted on the right in FIG. 6, the implementation of this first filter therefore comprises no more than 3 adders and 8 multipliers.

Figure 7:
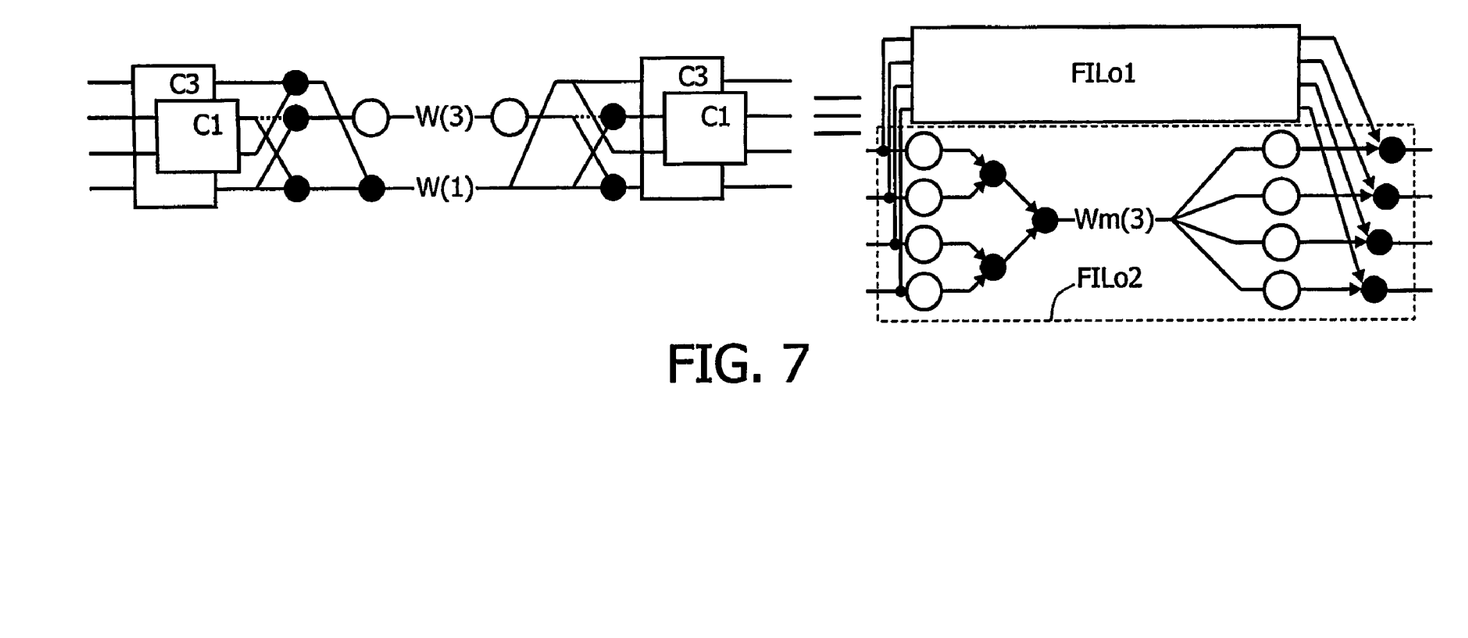

FIG. 7 depicts a second filter intended to filter the transformed data W(5) and W(7). A conventional implementation, as depicted on the left in FIG. 7, consists of eliminating the wires corresponding to the zeroed transformed data. As a conventional rotation comprises 2 additions and 4 multiplications, the conventional implementation consists of 14 additions and 18 multiplications.

The 2 multiplications by √2 can be omitted, one multiplication out of 2 amounting to a shift which is easy to implement. The transformed data item is then no longer W(3) but Wm(3), equal to W(3)/√2 before shifting and √2W(3) afterwards.

Using the linear properties of the multiplication, it is possible to decompose the filter according to the contribution of W(1) and that of Wm(3). It is then possible to draw on the modifications made for the filter FILo1 in order to simplify the structure around Wm(3) and result in the representation appearing on the right in FIG. 7 comprising, like the filter FILo1, 3 adders and 8 multipliers, the outputs of the last 4 multipliers then being added to the outputs of the filter FILo1. The part of the second filter external to the filter FILo1 is called filter FILo2. The final structure of the second filter, although comprising only 10 adders and 16 multipliers, that is to say less than the conventional implementation, is not optimal. However, it has the merit of reusing the filter FILo1, which means that the contribution of the new filter in terms of operators is in fact only 7 adders and 8 multipliers.

Figure 8:
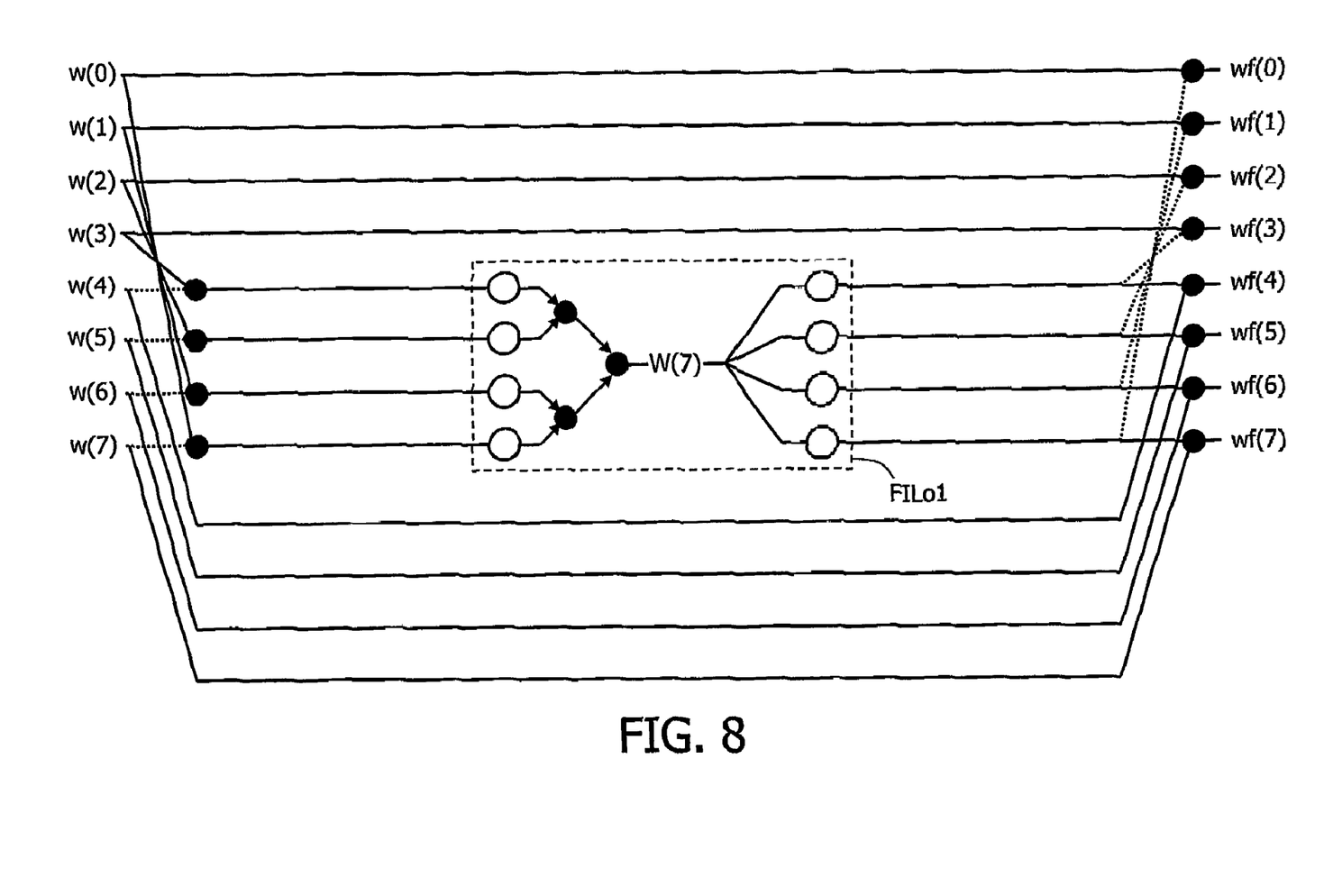
FIG. 8 is a diagram depicting a third filter intended to filter odd transformed data.

FIG. 8 depicts a third filter intended to filter only the coefficient W(7). It takes advantage of the linearity of the direct DCT and inverse IDCT discrete cosine transformations. For this purpose, the transformed data W can be divided into 2 subsets:

a first subset WZ corresponding to the frequencies for which the transformed data must be zeroed;
a second subset WNZ corresponding to the frequencies for which the transformed data must not be zeroed.

The transformed data W thus correspond to the concatenation of these two subsets, that is to say:

$$W = WZ|WNZ.$$

The filtered data wf are obtained by applying an inverse discrete cosine transformation to the corrected transformed data, which are either equal to WNZ or equal to 0, or in other words:

$$wf = IDCT(WNZ|0).$$

Using the linearity of the inverse discrete cosine transformation, there is obtained:

$$wf = IDCT(WNZ|WZ) - IDCT(0|WZ),$$

that is to say again wf=w−IDCT(0|WZ).

Giving the term Dw to the differential data which correspond to the difference between the original data w and the filtered data wf, means that:

$$Dw = IDCT(0|WZ) \text{ and } wf = w - Dw.$$

In this way a filter is obtained which functions in differential mode and a particularly economical implementation of which is illustrated in FIG. 8. The data filtering circuit according to this operating mode comprises:

a stage comprising 4 adders each performing, for lines 4 to 7, a subtraction of an original data item w(j) of line j from an original data item w(7−j) of line (7−j), and delivering odd intermediate transformed data;
the circuit FILo1 previously described;
a stage comprising 8 adders each performing:
for lines j=0 to 3, a subtraction of an intermediate filtered data item of line (7−j) issuing from the circuit FILo1 from the original data item w(j) of line j, for lines j=4 to 7, an addition of an intermediate filtered data item of line j issuing from the circuit FILo1 and the original data item w(j) of the same line.

The structure of the third filter because of this reuses the filter FILo1, which means that its contribution in terms of operators is zero.

Figure 9:
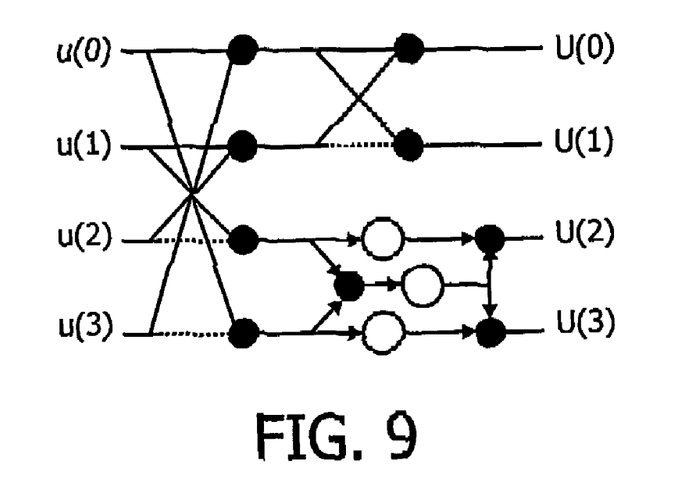
FIG. 9 depicts schematically a circuit intended to implement a DCTN transformation.

FIG. 9 depicts the circuit implementing a DCTN transformation, that is to say here a DCT4. Such a transformation comprises 6 additions and one rotation, that is to say finally 9 additions and 3 multiplications. This transformation is performed twice, once for the data segment u and once for the data segment v, requiring in total 18 additions and 6 multiplications.

Figure 10:
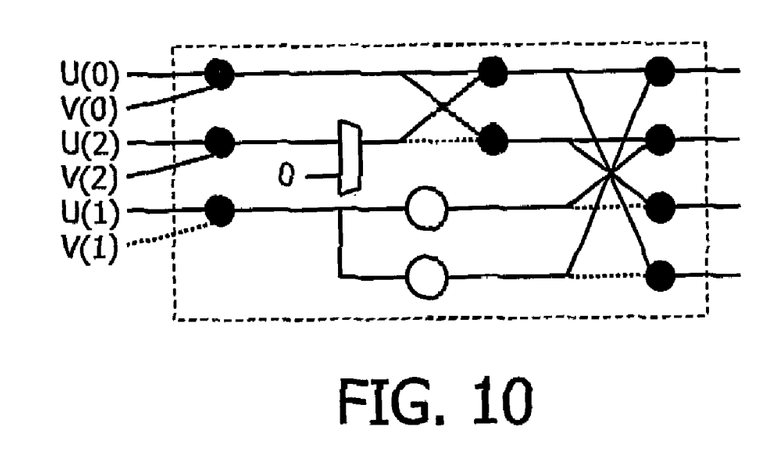
FIG. 10 is a diagram depicting a fourth filter intended to filter even transformed data.

In a particularly advantageous embodiment, it is possible also to filter the odd transformed data. This is particularly the case when the quantization step is greater than a predetermined value Qth, for example equal to 10 in the case of an implementation according to the MPEG-4 standard. This predetermined value corresponds to a threshold beyond which the image quality is greatly impaired, a correction to even transformed data mitigating this impairing. FIG. 10 depicts the filter FILe able to filter the transformed data item W(6) and where necessary the transformed data item W(4). The even transformed data W(i) are deduced from the transformed data U(i) and V(i) as follows:

$$W(0)=1/\sqrt{2}(U(0)+V(0))$$

$$W(2)=1/\sqrt{2}(U(1)-V(1))$$

$$W(4)=1/\sqrt{2}(U(2)+V(2))$$

If the transformed data item W(4) is to be filtered, a multiplexer replaces its value with zero. After simplification, the fourth filter therefore comprises 9 adders and 2 multipliers, the eighth stage ST8 not having been taken into account.

Figure 11:
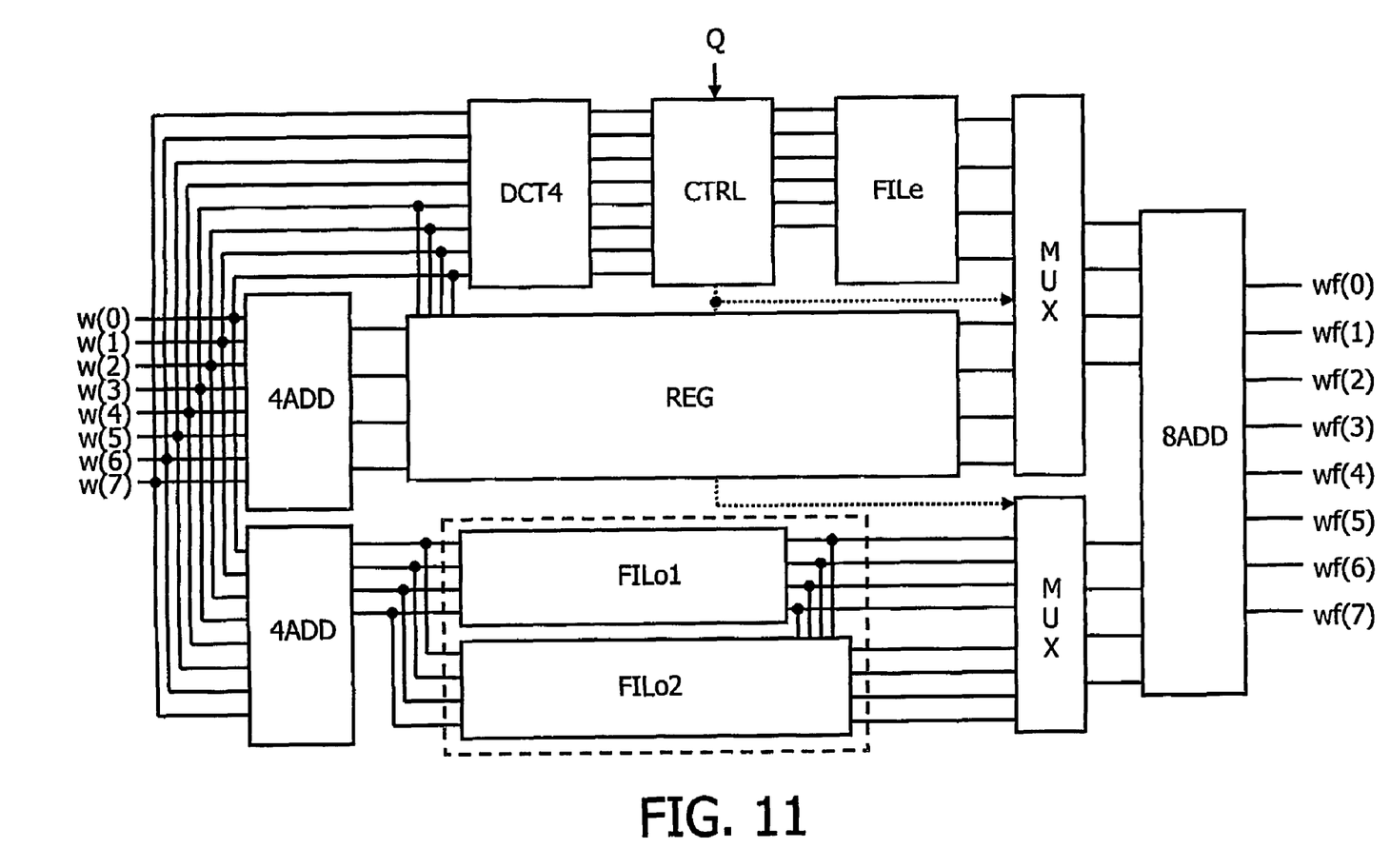
FIG. 11 depicts schematically the filtering circuit according to the invention.

FIG. 11 depicts the filtering circuit according to the invention. The circuit comprises a transformation module DCT4 comprising two circuits according to FIG. 9 or only one operating a double frequency and intended to calculate the discrete transform of the data segments u and v. It comprises a control circuit CTRL intended to calculate the coefficient kwpred from transformed data u and v and to determine the filtering module or modules to be used from kwpred and the quantization step Q. According to the values of kwpred and Q, the transformed data frequencies W which are to be filtered by the even filter FILe or the odd filter FILo are given in the following table:

| kwpred | Q < 10 | | Q > 10 | |
|---|---|---|---|---|
| | FILe | FILo | FILe | FILo |
| 2 | — | 3, 5, 7 | 4, 6 | 3, 5, 7 |
| 4 | — | 5, 7 | 6 | 5, 7 |
| 6 | — | 7 | — | 7 |
| 8 | — | — | — | — |

The filtering circuit according to the invention comprises two modules 4ADD and 4 adders each intended to form the additions of the original data w(0) to w(7) in accordance with the first stage ST1 of FIG. 3. It also comprises registers REG able to store on the one hand the results of the first adding module corresponding to the 4 higher additions of the first stage ST1 of FIG. 3 and on the other hand the original data w(0), w(1), w(2) and w(3). The filtering circuit comprises a first filtering module FILo1 intended to filter the last odd transformed data item W(7) or the last 3 odd transformed data W(3), W(5) and W(7), and a second filtering module (FILo2) intended to filter the last 2 odd transformed data W(5) and W(7). These filtering modules receive as an input the outputs of the second adding module corresponding to the 4 lower additions of the first stage ST1 of FIG. 3 and each deliver 4 intermediate filtered data, the second filtering module FILo2 using the outputs of the first filtering module FILo1. Finally, the filtering circuit comprises a third filtering module FILe intended to filter the last even transformed data item W(6) or the last 2 even transformed data W(4) and W(6) from the 6 transformed data U(0), V(0), U(1), V(1), U(2), V(2).

The control circuit CTRL then controls two multiplexers MUX, the first multiplexer making it possible to choose between the 4 outputs of the filter FILe and the data stored in the registers REG equal either to the 4 outputs of the first adder module or to the original data w(0), w(1), w(2) and w(3). The second multiplexer makes it possible to choose between the outputs of the filtering module FILo1 and those of the filtering module FILo2. The outputs of the two multiplexers are then sent to the input of a module 8ADD of the 8 adders intended to perform the additions in accordance with the eighth stage ST8 of FIG. 3 or of FIG. 8 in the case of the filtering of the transformed data item W(7) alone, resulting in filtered data wf(0) to wf(7).

If the value of kwpred is such that no filtering is necessary, the output of the filtering circuit consists of the original data w(0) to w(7), the control circuit CTRL controlling, for example, a multiplexer, not shown in the diagram, making it possible to choose between the filtered data wf and the original data w.

The complexity of said method is given in the following table for the various possible filtering configurations and for the conventional implementation of the filtering method:

| Configuration | Filtered data | Additions | Multiplications |
|---|---|---|---|
| Conventional | | 76 | 32 |
| Filtering step | — | 18 | 6 |
| A | 7 | 33 | 14 |
| B | 5, 7 | 44 | 22 |
| C | 3, 5, 7 | 37 | 14 |
| D | 5, 6, 7 | 49 | 24 |
| E | 3, 4, 5, 6, 7 | 42 | 16 |

The filtering circuit according to the invention performs a maximum of 49 additions and 24 multiplications, and hence there is an appreciable reduction in complexity compared with a conventional implementation. The filtering circuit can also be adapted to the content of the image represented by the coefficients kwpred and Q, which makes it possible to reduce the number of adders and multipliers used according to the type of filtering determined by the control circuit CTRL. The reduction in the number of operations performed by the filtering circuit thus makes it possible to save on the calculation resources or to accelerate the time taken to process the original data.

A first application of the invention consists of a video decoder able to supply decoded digital images and comprising a filtering circuit according to the invention, able to filter the decoded digital image so as to supply filtered digital images. This video decoder can be integrated in a portable apparatus in order to display the filtered digital data on a screen of said apparatus. This portable apparatus is, for example a mobile telephone or a personal digital assistant comprising an MPEG-4 video decoder.

Another application of the invention consists of a television receiver comprising a filtering circuit according to the invention, able to filter the digital images received by said receiver so as to display filtered digital images on a screen of said receiver.

The present invention has been described in the case of a filtering device able to filter a set of 8 digital data. A similar principle, based on a modular structure using the simplifications described above, can be applied to digital data filtering devices able to implement the calculation steps of a linear discrete transform of a set of $2^p$ original data, p being an integer greater than 3, and calculating a linear inverse discrete transform of the set of transformed data thus obtained.

No reference sign between parentheses in the present text should be interpreted limitingly. The verb "comprise" and its conjugations does not exclude the presence of elements or steps other than those listed in a sentence. The word "a" or "one" preceding an element or a step does not exclude the presence of a plurality of these elements or steps.

The invention claimed is:

1. A digital data filtering circuit to correct blocking artifacts in a frequency domain within a block-based video processing device, the digital data filtering circuit comprising:

means for performing a discrete linear transform to transform a set of input luminance values, from two adjacent video segments, into a corresponding set of transformed values in the frequency domain, wherein the transformed values in the frequency domain comprise a plurality of even transformed data values and a plurality of odd transformed data values;

means for performing an inverse discrete linear transform to transform the transformed values from the frequency domain to a corresponding set of filtered values for use on a display device coupled to the video processing device; and a control circuit coupled to the means for performing the discrete linear transform and the inverse discrete linear transform, wherein the control circuit is configured to selectively activate at least one of a plurality of filtering modules, wherein the plurality of filtering modules comprises at least one odd filtering module to filter at least one of the odd transformed data values and at least one even filtering module to filter at least one of the even transformed data values.

2. The digital data filtering circuit of claim 1, wherein the control circuit is further configured to selectively activate the at least one of the plurality of filtering modules based on a predicted maximum frequency (kwpred) and a quantization step (Q).

3. The digital data filtering circuit of claim 1, wherein the means for performing the discrete linear transform and the inverse discrete linear transform comprise:

a first odd filtering module (FILo1) of the plurality of filtering modules, wherein the first odd filtering module is configured to filter three of the odd transformed data values, wherein the three odd transformed data values filtered by the first odd filtering module comprises:

a first odd transformed data value having a highest frequency out of the odd transformed data values;

a second odd transformed data value having a second highest frequency out of the odd transformed data values; and a third odd transformed data value having a third highest frequency out of the odd transformed data values; and a second odd filtering module (FILo2) of the plurality of filtering modules, the second odd filtering module coupled to the first filtering odd module, wherein the second odd filtering module is configured to filter the first and second odd transformed data values having the highest and second highest frequencies, respectively.

4. The digital data filtering circuit of claim 3, wherein the means for performing the discrete linear transform and the inverse discrete linear transform further comprise:

discrete transform means coupled to the control circuit, the discrete transform means to transform a first half of the set of input luminance values into a first half of the transformed values in the frequency domain, and to transform a second half of the set of input luminance values into a second half of the transformed values in the frequency domain; and an even filtering module (FILe) coupled to the control circuit, wherein the even filtering module is configured to filter at least one of the even transformed data values, wherein the at least one even transformed data value filtered by the even filtering module comprises a first even transformed data value having a highest frequency out of the even transformed data values.

5. The digital data filtering circuit of claim 4, wherein the even filtering module is further configured to filter the first even transformed data value and a second even transformed data value, wherein the second even transformed data value comprises a second even transformed data value having a second highest frequency out of the even transformed data values.

6. The digital data filtering circuit of claim 4, wherein the discrete transform means is further configured to transform the first and second halves of the set of input luminance values into the first and second halves of the transformed values in the frequency domain, respectively, in succession at a double frequency.

7. The digital data filtering circuit of claim 4, wherein the first half of the set of input luminance values comprises data of even parity from one of the two adjacent video segments, and the second half of the set of input luminance values comprises data of even parity from the other of the two adjacent video segments.

8. The digital data filtering circuit of claim 4, wherein the first half of the set of input luminance values comprises data of odd parity from one of the two adjacent video segments, and the second half of the set of input luminance values comprises data of odd parity from the other of the two adjacent video segments.

9. The digital data filtering circuit of claim 4, wherein the first half of the set of input luminance values comprises highest rank data one of the two adjacent video segments, and the second half of the set of input luminance values comprises lowest rank data from the other of the two adjacent video segments.

10. A video decoder comprising the digital data filtering circuit of claim 1, wherein the video decoder is configured to supply filter digital images and supply decoded digital images to the display device.

11. A portable apparatus comprising the digital data filtering circuit of claim 1 and the display device, wherein the portable apparatus is configured to display filtered digital images on the display device.

12. A television receiver comprising the digital data filtering circuit of claim 1, wherein the television receiver is configured to filter digital images received by the television receiver and to display filtered digital images on a screen coupled to the television receiver.

* * * * *